United States Patent Office.

CARLETON B. HUTCHINS, OF ANN ARBOR, MICHIGAN.

Letters Patent No. 98,065, dated December 21, 1869.

IMPROVED ROOFING-COMPOUND.

The Schedule referred to in these Letters Patent and making part of the same.

I, CARLETON B. HUTCHINS, of Ann Arbor, county of Washtenaw, and State of Michigan, have invented a new and improved Composition for Covering Roofs and other structures.

The nature of my invention consists in the compounding of ingredients, with directions hereafter named.

To prepare this composition, I take one pound of resin, four pounds of vegetable tar, four pounds of ground slate or ground stone of any kind, one-half pound of cut straw, or any kind of tough-fibred dried grasses, and one-quarter of a pound of hair. Clean gravel can be mixed in, or applied to the top. I heat slowly, and stir until all is melted and well mixed.

Then apply with a trowel on matched boards, or any other structure you may wish.

You can increase or diminish any of these ingredients; or, for a top-dressing, I omit the straw and increase the hair.

This compound makes a durable, tough, and flexible covering for roofs and other structures.

I claim as my invention, the compounding of the before-named ingredients, to make a covering to be used as before named, for roofs and other structures.

CARLETON B. HUTCHINS.

Witnesses:
   E. R. HUTCHINS,
   N. W. HUTCHINS.